United States Patent [19]

Brailsford

[11] 4,426,250

[45] Jan. 17, 1984

[54] STRIPPER SYSTEM FOR SURFACES

[76] Inventor: Michael I. D. Brailsford, Dorton Hill House, Chilton, Nr. Aylesbury, Buckinghamshire, England

[21] Appl. No.: 311,769

[22] Filed: Oct. 15, 1981

[30] Foreign Application Priority Data

Feb. 2, 1981 [GB] United Kingdom ............... 8100084
Apr. 29, 1981 [GB] United Kingdom ............... 8113249

[51] Int. Cl.$^3$ .................. B44C 1/22; C03C 15/00; B08B 7/00; C23D 17/00
[52] U.S. Cl. ......................... 156/655; 134/38; 156/345; 252/79.5; 252/156; 252/DIG. 8
[58] Field of Search ............... 252/79.5, 156, DIG. 8; 156/345, 635, 636, 638, 654, 655, 656; 134/2, 29, 38–40, 42, 201; 15/208

[56] References Cited

U.S. PATENT DOCUMENTS

| | | | |
|---|---|---|---|
| 1,581,413 | 4/1926 | Yoakam | 134/38 X |
| 2,958,146 | 11/1960 | Van Dusen et al. | 156/905 X |
| 2,968,056 | 1/1961 | Aveni | 134/38 X |
| 3,411,973 | 11/1968 | Siler | 156/905 X |
| 3,677,756 | 7/1972 | Protzman | 430/299 X |
| 3,950,185 | 4/1976 | Toyama et al. | 134/38 |

*Primary Examiner*—William A. Powell
*Attorney, Agent, or Firm*—Kontler, Grimes & Battersby

[57] ABSTRACT

A stripper system comprises: a stripper composition for treating a surface so as to give removable treatment product for stripping at least a portion of said surface, said composition comprising at least one component chosen from: alkali metal oxides, alkali metal hydroxides, alkali metal carbonates, alkali earth metal oxides, alkali earth metal hydroxides, and alkali earth metal carbonates; and cover means for covering said composition at least a portion of time said composition treats said surface, said cover means being adapted to remove at least a portion of said treatment product when said cover means is moved in at least one direction appropriate for that removal. Preferably, the stripper composition includes sodium hydroxide and calcium hydroxide. Preferably, the cover means is an endless fibre fabric comprising polypropylene fibre and having a pile. The stripper system can be embodied for different applications, e.g. for stripping coatings of cured paint and/or of cured varnish.

21 Claims, No Drawings

STRIPPER SYSTEM FOR SURFACES

It is known to strip a surface by treating the surface with a cured coating of paint or varnish from a stripper system.

According to a first aspect of the present invention, a peel away system for decomposing a surface coating, wherein said system comprises: an alkaline stripper composition for treating a surface so as to give removable decomposed surface coating, said composition comprising at least one component (a) chosen from: alkali metal oxides, alkali metal hydroxides, alkali metal carbonates (e.g. bicarbonates or other carbonates of alkali metals), alkali earth metal oxides, alkali earth metal hydroxides, and alkali earth metal carbonates (e.g. bicarbonates or other carbonates of alkali earth metals); and cover means for covering said stripper composition and removable decomposed surface coating, said cover means being at least partly permeable to liquid, said permeability including opposite faces of said cover means, a said face for contacting said stripper composition being able to lift at least a portion of removable decomposed surface coating so as to remove that at least a portion of removable decomposed surface coating when said cover means is peeled away, said stripper composition optionally being provided as solid particles to be converted by liquid into said composition.

The or each component (a) can be provided in any suitable way; and in any suitable form, e.g. as anhydrous or hydrated material. Preferred components (a) are sodium hydroxide (available as solid particles of caustic soda), and/or potassium hydroxide (available as solid particles of potash), and/or calcium hydroxide (available as solid particles of hydrated lime), and/or magnesium hydroxide (available as solid particles). It will be appreciated that e.g. barium hydroxide and/or strontium hydroxide could be utilised, but they are more expensive. Preferably, both sodium hydroxide and calcium hydroxide (available as hydrated lime) are in the stripper composition.

The stripper composition can contain (i) at least one material chosen from: alkali metal oxides, alkali metal hydroxides, and alkali metal carbonates; and/or (ii) at least one material chosen from: alkali earth metal oxides, alkali earth metal hydroxides, and alkali earth metal carbonates. The ratio of total material (i) % weight to total material (ii) % weight, based on the sum of the total weights of material (i) and material (ii), can be any convenient value, e.g. in the range (1 to 50) % weight of total material (i) to (99 to 50) % weight of total material (ii), preferably (5 to 15) % weight of total material (i) to (95 to 85) % weight of total material (ii), for instance substantially 10% weight of total material (i) to substantially 90% weight of total material (ii).

The stripper composition can comprise, together with said at least one component (a), at least one component (b) chosen from at least one liquid, e.g. inorganic liquid and/or organic liquid. Examples of inorganic liquid are water and/or ammonium hydroxide (available as household ammonia). Examples of organic liquids are chlorinated hydrocarbons, e.g. methylene chloride. Preferably, in domestic use, no organic liquid will be utilised, but such liquid could be used if appropriate precautions are taken. The ratio of the total weight of said at least one component (a) to the total weight of said at least one component (b) can be any convenient value, e.g. in the range 0.5/1.0 Kg/liter to 1.5/1.0 Kg/liter, e.g. substantially 0.8/1.0 Kg/liter or substantially 1.3 Kg/liter. It should be noted that if a surface can decompose in response to dry stripper composition, said at least one component (b) need not be used but some liquid may be convenient.

The stripper composition can comprise, together with said at least one component (a) and/or said at least one component (b), at least one component (c) chosen from additives suitable for modifying at least one property of the stripper composition, so as to enable and/or enhance control of its use. Examples of known additives are solid, liquid, and/or gaseous additives, for instance additives chosen from: accelerators, adhesives, carriers, corrosion inhibitors, dyes, foam producing agents, gelling agents, plasticisers, and surfactants (e.g. detergents or other surface tension modifiers, for instance the soap sodium lauryl sulphate). Any said additive can serve at least one additive function, e/g. an adhesive can also be a gelling function. One preferred group of additives are polysacharides, e.g. starches from natural materials with or without chemical modification thereof, for instance: flours or meals derived from seeds (e.g. from cereals) or tubers (e.g. potatoes). The word "seed" includes e.g. beans or nuts. Another group of preferred additives are celluloses and derivatives of celluloses. Examples of those derivatives are $C_{1-4}$-alkyl celluloses, for instance methyl or ethyl cellulose; hydroxy-$C_{1-4}$-alkyl celluloses, for instance hydroxymethyl or hydroxyethyl cellulose; other cellulose ethers; cellulose esters; and cellulose salts (e.g. sodium carboxymethylcellulose). Various wallpaper pastes contain cellulose derivatives, e.g. wallpaper paste sold under the trade name "Rex" contains dimethyl carboxy cellulose, and is a suitable additive for the present invention. Sodium carboxymethylhydroxyethyl cellulose is another instance of a "carboxy" cellulose. Another preferred group of additives are polymeric alcohols that are not polysacharides, e.g. polyvinyl alcohol. A further preferred group of additives are polymeric esters that are not polysacharides, e.g. polyvinyl acetates or polyvinylmethacrylates. Examples of some other groups of additives are vegetable derived proteins or animal derived proteins, the former being e.g. present in flours or meals, the latter being e.g. gelatines or isinglasses. Pectins can be used. Preferably, any said component (c) is hydrophilic sufficiently to enable its dispersion, e.g. for giving gel in the presence of water, preferably at room temperature. The total weight of said at least one component (c) can be any convenient value, e.g. 1 to 10 parts by weight per 100 parts by weight of the total weight of said at least one component (a), e.g. substantially 5 parts by weight of the total weight of said at least one component (c).

Said permeable cover means can have any suitable nature, e.g. be at least partly flexible, be at least partly rigid, be at least partly continuous, be at least partly discontinuous, be at least partly permeable, or be at least partly impermeable. At least one of those properties can be possessed by the cover means. Preferably, said cover means has a pile to which said removed treatment product is attached. The pile elements can be provided in any suitable way and have any suitable nature. Preferably, said cover means comprises fabric having said pile, e.g. in the form of pile elements resulting from the process of making the fabric. Any said pile element can have any shape(s) and disposition(s), e.g. have free ends or loops. Preferably, said fabric having pile is a felt available under the trade name "POLYFELT TS" from Chemie Linz A. G. of Austria. A brochure entitled "POLYFELT TS" issued by Chemie Linz A.G. under the reference 3277/78/03 engl. states on page 2 that "POLYFELT TS" refers to a material that is "an endless fibre fabric which is produced by a purely mechanical procedure by means of needle punching, and that "POLYFELT TS" has a preferential permeability to water;" page 40 refers to polypropylene endless-fibres from which "POLYFELT TS" is made. I have found that "POLYFELT TS" is very suitable for use in the present invention. In general, said cover means can comprise any material(s) in its constitution, e.g. polypropylene as mentioned above, other polyalkylenes, polyamides (e.g. nylons), polyesters (e.g. terylenes), and polyvinylhalides (e.g. polyvinylchlorides). Although synthetic "cover" materials are convenient, natural material(s) can be used, e.g. cotton, wool, or fur, if desired together with at least one synthetic "cover" material. When the cover means is at least partly permeable, the permeability should preferably be such that any solid particles in the stripper composition and/or treatment product do not pass through and out of the cover means. Impermeability of the cover means can be sufficient to prevent uncontrolled drying of stripper composition and/or of wet decomposed surface coating via the cover means. The material(s) chosen for the cover means will depend on practical circumstances, e.g. the period of application of the stripper composition. If desired, the cover means can be held in place during use of the stripper system, this holding being in addition to adhesion provided by means of the stripper composition and/or decomposed surface coating. For example, at least one portion (e.g. an edge) of the cover means can be bonded or fixed by fastener means e.g. to another portion of the cover means (e.g. when one edge overlaps another edge thereof) or to something else e.g. a member bearing any surface to be treated by the stripper system. Examples of the fastener means comprise for instance at least one of: pressure sensitive adhesives, and latching devices (e.g. snap fasteners and/or zips and/or buttons).

It will be appreciated that the stripper system can be used in any suitable way. In one mode, the stripper composition is first applied to the surface to be treated, and thereafter the cover means is placed on the applied stripper composition. In another mode, the stripper composition is first applied to the cover means, and thereafter the applied stripper composition is placed on the surface to be treated. The stripper composition and/or cover means, can be provided in ways suitable for dispensing, e.g. from dispenser means that let a web or portions of preformed stripper system be withdrawn or exposed for use. A roll of cover means or of preformed stripper system can be provided as a dispenser roll that can be unwound. When the stripper system is preformed, the stripper composition can be protected by removable protective means, e.g. sheet or strip means having release properties, for instance a release liner in a roll of the stripper system, or release strip on the stripper composition. The preformed stripper system can be sheetlike, striplike, or padlike.

The stripper system can be used in any suitable application, e.g. in building construction or maintenance of any kind, or in other kinds of construction or maintenance, e.g. road construction where a paint coating is to be removed from a road surface.

The following are some specific Examples of the present invention.

EXAMPLE 1

10% by weight of fine particles of solid caustic soda were mixed with 90% by weight of fine particles of solid hydrated lime. 2 Kg of the resultant dry composition X were mixed with 1.5 liters of water at room temperature. The resultant product was then used in two alternative modes: (1) in which the product is coated onto a painted surface and wet POLYFELT TS felt applied to the coating; and (2) in which the product is on wet POLYFELT TS felt and then applied to a painted surface. After a period of several hours for modes (1) and (2), the POLYFELT TS was removed, and a substantial amount of treatment product formed from the paint was removed with the POLYFELT TS.

EXAMPLE 2

To 100 parts by weight of composition X made as in Example 1 were added substantially 5 parts by weight of "Rex" wallpaper paste, dry, see above. The modified composition was put into two samples to which water was added; i.e. Sample A was 2 Kg modified composition with 1.5 liters of water, and Sample B was 1 Kg modified composition with 1.13 liters of water. Samples A and B were then used in modes (1) and (2) of Example 1. The treatment periods compared with Example 1 were substantially reduced as a result of the wallpaper paste.

EXAMPLE 3

To composition X of Example 1 and to the modified composition X of Example 2 were respectively added substantially 5 parts by weight of sodium lauryl sulphate. The resultant compositions were put into samples A,B,C,D, in a manner similar to that described in Example 2, and water was added in accordance with the ratios given in Example 2, such that there were two samples corresponding to Example 1 and 2 samples corresponding to Example 2. The treatment periods used in modes corresponding to those of Examples 1 and 2 gave good results in the removal of treatment product by POLYFELT TS.

Said permeable cover means can be wetted before or during use, so as to prevent the cover means from drying stripper composition. At least one component (b) can be provided via the cover means acting e.g. as a wick. The removed cover means can be washed and made ready for reuse. polished surface, which can be washed, etc.

EXAMPLE 4

The following dry composition of the present invention had the dry formulation:

| Component | Parts by weight |
| --- | --- |
| Fine particles of solid caustic soda. | 10.00 |
| Fine particles of solid hydrated lime. | 84.00 |
| "Rex" wallpaper paste (see earlier above) (dry) or Celacol (dry) or Courlose (dry). | 3.00 |
| Fine particles of wheat starch, Jalan D57, available from Laing National Ltd., England. | 2.00 |
| Sodium lauryl sulphate powder. | 1.00 |
| | 100.00 |

EXAMPLE 5

The following dry composition of the present invention had the dry formulation:

| Component | Parts by weight |
| --- | --- |
| Fine particles of solid caustic soda. | 10.00 |
| Fine particles of solid hydrated lime. | 84.00 |
| Fine particles of wheat starch, Jalan D57. | 5.00 |
| Sodium lauryl sulphate powder. | 1.00 |
|  | 100.00 |

Water soluble cellulose ethers suitable for use in the present invention are readily available, e.g. under the trade marks CELACOL and COURLOSE of British Celanese Limited; for instance sodium carboxymethyl cellulose for COURLOSE; and hydroxyethyl cellulose, hydroxypropyl methyl cellulose, or methyl cellulose for CELACOL.

Wherefore I claim:

1. A peel-away system for decomposing and stripping away a cured surface coating of paint or varnish from a surface, said system including a stripper composition for decomposing said coating and cover means adapted to cover said stripper composition and said surface coating and further adapted to lift a portion of the decomposed surface coating from said surface when said cover means is peeled away from said surface, wherein said cover means includes pile means to which said decomposed surface coating may be attached.

2. The system of claim 1 wherein said stripper composition includes at least one alkaline material selected from the group consisting of alkali metal oxides, alkali metal hydroxides, alkali metal carbonates, alkali earth metal oxides, alkali earth metal hydroxides and alkali earth metal carbonates.

3. The system of claim 1 wherein said stripper composition includes an alkaline material selected from the group consisting of sodium hydroxide, potassium hydroxide, calcium hydroxide, magnesium hydroxide, barium hydroxide and strontium hydroxide.

4. The system of claim 1 wherein stripper composition includes an alkaline material and a liquid.

5. The system of claim 4 wherein said liquid is selected from the group consisting of inorganic liquids and organic liquids.

6. The system of claim 4 wherein said liquid comprises ammonium hydroxide.

7. The system of claim 1 wherein said cover means are flexible.

8. The system of claim 7 wherein said cover means comprises a fabric including pile elements.

9. The system of claim 8 wherein said cover means is felt.

10. The system of claim 8 wherein said cover means is an endless fibre fabric produced by needle punching.

11. A peel-away system for decomposing and stripping away a cured surface coating of paint or varnish from a surface, said system including:

an alkaline stripper composition for decomposing said surface coating, said composition including an alkaline material selected from the group consisting of alkali earth metals and alkali metals and a liquid; and a flexible, semi-permeable cover including pile means, said cover adapted to cover said stripper composition and said surface coating and further adapted to lift a portion of decomposed surface coating from said surface by attachment between the pile means and the decomposed surface when said cover means is peeled away from said surface.

12. The system of claim 11 wherein said alkaline material is selected from the group consisting of alkali metal oxides, alkali metal hydroxides, alkali metal carbonates, alkali earth metal oxides, alkali earth metal hydroxides and alkali earth metal carbonates.

13. The system of claim 11 wherein said alkaline material includes at least one alkali metal selected from the group consisting of alkali metal oxides, alkali metal hydroxides and alkali metal carbonates and at least one alkali earth metal selected from the group consisting of alkali earth metal oxides, alkali earth metal hydroxide and alkali earth metal carbonate.

14. The system of claim 13 wherein said alkali metal comprises between about 5% and about 15% by weight of the alkaline material and wherein the alkali earth metal comprises between about 85% and about 95% by weight of the alkaline material.

15. The system of claim 11 wherein said liquid is selected from the group consisting of inorganic liquids and organic liquids.

16. The system of claim 11 wherein said composition further includes an additive selected from the group consisting of accelerators, adhesives, carriers, corrosion inhibitors, dyes, foam producing agents, gelling agents, plasticizers and surfactants.

17. The system of claim 11 wherein said cover comprises a fabric material having a pile selected from the group consisting of felt, polypropylenes, polyalkylenes, polyamides, polyesters, polyvinylhalides, cotton, wool and fur.

18. The system of claim 11 wherein said cover includes fastener means for affixing said cover means to said surface.

19. A method for stripping a cured surface coating of paint or varnish from a surface, said method comprising the steps of:

providing a peel-away system for decomposing and stripping away said surface coating, said system including a stripper composition for decomposing said coating and cover means including pile means to which the decomposed surface coating may be attached, said cover means being adapted to cover said composition and said surface coating and further adapted to lift a portion of the decomposed surface coating from said surface;

applying said composition and said cover means to said surface coating;

permitting said composition to react with and decompose said surface coating; and stripping said surface coating by peeling away said cover means.

20. The method of claim 19 wherein the composition is directly applied to the surface coating and the cover means are applied over said composition.

21. The method of claim 19 wherein the composition is applied to one side of the cover means which is then applied on the surface coating.

* * * * *